United States Patent Office 3,769,402
Patented Oct. 30, 1973

3,769,402
PREPARATION OF A HORMONAL
DUODENUM EXTRACT
Pierre Jacques Louis Fabre and Lucien Jean Dussourd
d'Hinterland, Castres, France, assignors to Investigations Scientifiques Pharmaceutiques, Castres, France
No Drawing. Filed May 14, 1971, Ser. No. 143,613
Int. Cl. A61k 17/00
U.S. Cl. 424—104
11 Claims

ABSTRACT OF THE DISCLOSURE

A hormonal duodenums extract is prepared by contacting a duodenums freshly taken from an animal with dilute hydrochloric acid. The extract is treated with ethanol with successive adjustments of the pH value of the ethanolic solution followed by treatment with acetone and ether to give an extract from which pancreozymin and secretin can be separated.

---

This invention relates to a process for the preparation of a hormonal product extracted from the duodenums of animals, for example pigs. Suitably purified, the product has particularly interesting therapeutic applications.

According to the invention, this hormonal product is obtained by a process which can be divided into several stages principally comprising the actual extraction process which gives the crude hormone, followed by preparation of a semi-purified hormone and finally by successive purification operations.

In the first stage, duodenums freshly taken from animals are contacted with dilute hydrochloric acid in order to extract the crude hormone. The dilute hydrochloric acid in which the crude hormone dissolves preferably has a concentration equal to about 0.5%.

After filtration, where necessary on progressively finer filters, the product contains the crude hormone together with a certain quantity of protein-based impurities and vasodilation which is a substance of the histamine type normally present in the intestinal cells.

In the second stage, the semi-purified hormone accompanied by small quantities of proteins and vasodilatatin is precipitated by the addition to the filtered solution of the crude hormone of a highly concentrated neutral salt capable of promoting salting-out. Salting out is essentially the precipitation of proteins in aqueous solution effected by the addition of certain highly concentrated neutral salts. This precipitation is governed by the type of protein, by the neutral salt and its concentration, by the pH-value and by the temperature.

In the present case, pure dry sodium chloride is used for salting out.

After the semi-purified hormone has been dissolved, several salting out operations are carried out in the third stage of the process in order to eliminate impurities, accompanied by concentration of the successive solutions, after which the vasodilatin and the inactive proteins are iso-electrically precipitated at pH-values around 5.2, 4 and 7.5, giving a solution of purified hormone.

In the fourth stage of the process, the purified hormone is obtained by precipitation with trichloroacetic acid, the precipitate being washed with suitable organic solvents and then dried in vacuo in the absence of moisture.

According to one of its particularly advantageous aspects, the invention also relates to the preparation of two purified duodenum hormones, namely secretin and pancreozymin, from a hormonal duodenum product obtained by all or part of the process described in the foregoing.

These two hormones are particularly interesting in the therapeutic field and principally for exploring the external pancreatic function. They can each be presented in a separate bottle sterilely sealed under nitrogen and packed together in a common wrapping.

The principle involved in producing secretin and pancreozymin is based on the difference in solubility at certain pH-values of these two hormones and other duodenum hormones in certain organic solvents.

According to the invention, a purified hormonal duodenum extract is treated with ethanol, giving an ethanolic solution whose pH-value is successively adjusted to around 5.2 to precipitate the vasodilatin which is eliminated, and to around 7.5 to precipitate the proteins which are eliminated, after which the resulting ethanolic solution is treated with acetone and anhydrous ether to bring its pH-value back to around pH 3 to precipitate an extract which can optionally be dried in the form of a white powder and which contains the secretin and the pancreozymin.

The pancreozymin on the one hand and the secretin on the other hand are separated from this extract. For this purpose, the extract is treated with methanol which gives an insoluble fracion and a methanolic solution.

Suitably washed and dried, the insoluble fraction gives a white powder containing pancreozymin.

The methanolic solution is purified by successive adjustments of its pH-value to around 5.2 and to around 7.5. The precipitates obtained during each adjustment are eliminated and the resulting solution, following adjustment of its pH-value to around 6, is treated with ether to give a precipitate which, after washing and drying, is in the form of a white powder containing secretin.

The purified hormonal duodenum extract used as starting material in the operations described here can be the purified powder obtained by the full application of the process in four stages described in the foregoing.

It is also possible to use as starting material the hormonal extract purified in solution obtained on completion of the third stage of the process. In this case, instead of precipitating the extract with a trichloroacetic acid solution, the extract is precipitated with a saturated sodium chloride solution and the precipitate is washed with acetone and anhydrous ether before being dried in the form of a white powder which also contains mineral elements.

The two powders obtained by applying the process according to the invention to the hormonal extract in the form of the aforementioned white powder can be subjected to additional purifications by dialysis and treatment with acetone and anhydrous ether, followed by drying, which gives light high-purity powders containing pancreozymin and secretin, respectively.

The invention is illustrated by the following examples.

EXAMPLE 1

Extraction is carried out from duodenums freshly taken from pigs and washed with cold running water.

One end of the duodenum is tied and a sufficient quantity of 0.5% hydrochloric acid, i.e. approximately 400 to 500 cc., is introduced through the open part. The open end is then closed with pincers, after which the hydrochloric acid is left in contact with the duodenum for about an hour.

The crude hormone dissolves in the acid solution whose action is comparable with the action of the gastric chyme acid in a human being which, during its passage into the duodenum, releases the aforementioned hormone.

The solution is collected and filtered on cheese cloth. It contains the crude hormone together with a certain quantity of protein-based impurities and vasodilatin. A second filtration is carried out on gauze, followed by a third filtration on filter paper.

The solution thus filtered is placed in a stainless steel tank. 28% of pure dry sodium chloride are added, followed by complete dissolution, after which the tank is kept for 12 to 18 hours in a refrigerator at a temperature of from 2 to 4° C.

The hormone is completely precipitated in semi-pure form, in other words it still contains small quantities of vasodilatin and protein substances.

After this initial salting out, the product is filtered on paper which gives a precipitate that is conserved and a saline filtrate which is discarded. The semi-pure precipitate is suspended in six litres of a pure sulphuric acid solution diluted to 5%. After gentle stirring at room temperature, the product is left standing and then filtered in a refrigerator until a perfectly clear solution is obtained, the impurities remaining on the filter.

The hormone solution thus obtained is adjusted by the addition of caustic soda to pH 5.2–5.4 which corresponds to the iso-electric point of vasodilatin. After stirring in the absence of foaming, the solution is left standing in a refrigerator for 1 hour, giving a slight flocculated precipitate of vasodilatin.

The purified hormone solution which should be perfectly clear is collected by filtration. A second salting out is carried out with sodium chloride.

This solution is adjusted to pH 4 with caustic soda. After gentle stirring, the solution is left standing in a refrigerator for a period of 12 hours, giving a slight precipitation of proteins.

A purified hormone solution which should be perfectly clear and slightly opalescent is collected by filtration. A third salting out is carried out with sodium chloride.

The purified hormone precipitate thus obtained is dried and then dissolved in as high a concentration as possible in sulphuric acid diluted to 1%. After gentle stirring, the solution is left standing and then filtered in a refrigerator.

The hormone solution thus obtained should be clear and slightly opalescent. Its pH is then adjusted to 7.5 with caustic soda, giving a flaky precipitate of inactive proteins which is left standing in a refrigerator for 1 hour.

This is followed by filtration and collection of the hormone solution which should be clear, this operation being carried out in a refrigerator at a temperature of from 2 to 3° C. This solution is then very quickly adjusted to pH 3 with pure acetic acid. 12.5% of a 50% trichloroacetic acid solution are then added to this solution. The product is then stirred and left in contact for 1 hour in decantation ampoules. The purified hormone precipitates in the form of white flakes.

The precipitate which is collected by centrifuging is washed with acetone in a quantity of four volumes of acetone to one volume of hormone. This operation, carried out three times, has the object of drying the hormone and of eliminating any lipido-protein substances that may be entrained in the precipitates together with traces of trichloroacetic acid.

This is followed by another wash with anhydrous ethyl-ether in a quantity of three volumes of ether to one volume of hormone. This operation carried out three times eliminates every trace of water.

Finally the hormone is dried in vacuo in the presence of phosphoric anhydride, giving a pure duodenum hormone.

EXAMPLE 2

This example relates to the preparation of secretin and pancreozymin from a purified powder of hormonal duodenum extracts obtained by full application of the process described in detail in Example 1.

100 g. of the aforementioned hormonal duodenum extract are treated with 500 cc. of 90% iced ethanol at a temperature of around +4° C. The product is then stirred for 5 to 6 hours in a refrigerator, this operation being repeated twice. The alcoholic solutions obtained are combined and filtered.

The pH-value of the resulting alcoholic solution is adjusted to around 5.2 with a alcoholic NaOH which promotes the formation of a vasodilatin precipitate which is left standing for 12 hours in a refrigerator. This precipitate is then eliminated by centrifuging in the cold.

The pH-value of the supernatant alcoholic solution is then adjusted to around 7.5 which promotes the formation of a precipitate of proteins which is left standing for 12 hours in a refrigerator. This precipitate is then eliminated by centrifuging in the cold.

The pH-value of the supernatant solution is adjusted to around 3 with hydrochloric acid and the duodenal hormones are precipitated with 5 volumes of acetone/anhydrous ether. The product is left standing in a refrigerator for 12 hours after which the hormone precipitate is collected by centrifuging.

This precipitate is treated with 3 volumes of anhydrous acetone and then with 2 volumes of anhydrous ether. The product is then dried in vacuo in the presence of $P_2O_5$, giving a white powder containing secretin and pancreozymin together with protein-based impurities and mineral elements such as sodium chloride.

This is followed by further purification and separation of the duodenal hormones carried out as follows:

10 g. of the aforementioned powder are treated with 500 ml. of iced methanol. After the product has been vigerously stirred for 4 hours at around —5° C., an insoluble fraction is collected by centrifuging in the cold, being treated again with 1 volume of iced methanol.

Ultimately, therefore, this gives on the one hand a white residue containing pancreozymin and, on the other hand, methanolic solutions which are combined and kept in a refrigerator and which contain secretin.

The white residue is washed with acetone and with iced anhydrous ether after which it is dried in vacuo in the presence of $P_2O_5$, giving a white powder, pancreozymin.

Returning to the methanolic solutions kept in the refrigerator, their pH-value is adjusted to around pH 5.2 with an alcoholic solution of caustic soda. The product is then left standing in a refrigerator for 12 hours, giving a precipitate which is separated by centrifuging in the cold, and eliminated.

The pH-value of the methanolic solution is adjusted to around 7.5 after which it is left standing in a refrigerator for a period of 12 hours, giving a light precipitate which is separated by centrifuging in the cold and eliminated.

The pH-value of the remaining methanolic solution is then adjusted to around 6 and the secretin is precipitated by the addition of 3 volumes of anhydrous ether, stirring and leaving to stand in a refrigerator. The precipitate is collected by centrifuging in the cold and is then dried in vacuo in the presence of $P_2O_5$, giving secretin in the form of a white powder.

EXAMPLE 3

This example illustrates the preparation of secretin on the one hand and pancreozymin on the other hand from a hormonal extract purified in solution obtained on completion of the third stage of the process described in Example 1. In this case, instead of precipitating the extract with a trichloroacetic acid solution, the extract is precipitated with a saturated sodium chloride solution.

After the precipitate obtained has been dried, 7 volumes of iced anhydrous acetone are added followed by gentle stirring for 12 hours in a refrigerator.

The insoluble residue formed is separated and treated with another 7 volumes of iced anhydrous acetone for a few hours.

The acetone-insoluble precipitate formed is separated and washed with 3 volumes of anhydrous ether. The ethereal solution is separated, dried and the product thus obtained is dried in vacuo in the presence of $P_2O_5$.

An intense white powder is obtained which still contains mineral elements.

100 g. of this powder are subjected to the treatment described in Example 2, giving two powders, one containing pancreozymin and the other secretin.

The products thus obtained can be further purified. The following procedure can be adopted for each of them:

The product is dissolved in distilled water adjusted to pH 4. The resulting solution is then introduced into the cell of a dialyser equipped with Cellophane 300 membranes. The solution is dialysed against ice water in a refrigerator for a period of from 10 to 12 hours.

5 volumes of anhydrous acetone and then three times the initial volume of anhydrous ether are added to the dialysate obtained. This gives a light white precipitate which is collected by centrifuging. The precipitate is treated three times with its own volume of anhydrous ether and then dried in vacuo in the presence of $P_2O_5$.

Secretin and pancreozymin are thus obtained in the form of light white powders.

We claim:

1. A process for extracting hormonal substance containing secretin and pancreozymin from the freshly taken duodenum of an animal, comprising the steps of:
   (a) soaking the intestine in a .5% dilute hydrochloric acid solution to extract the crude hormone which is separated by filtration;
   (b) precipitating the crude hormone by addition to the filtered solution of about a 28% sodium chloride which also salts out the unwanted proteins and vasodilatin;
   (c) repeating the salting out operation as in (b) several times in order to purify the hormone and concentrate the successive solutions;
   (d) iso-electrically precipitating vasodilatin and the inactive proteins at a pH around 5.2 and 7.5 thereby leaving a solution containing purified hormone; and
   (e) precipitating the purified hormone with trichloracetic acid, separating, washing and drying the precipitate to obtain a purified hormone in powder form.

2. A process according to claim 1 which further comprises forming an ethanolic solution of the precipitate of step (e) successively adjusting pH of said ethanolic solution to about 5.2 to precipitate vasodilatin which is removed and to about 7.5 to precipitate proteins which are removed, adjusting pH of said ethanolic solution to about 3 to precipitate a powder containing pancreozymin and secretin which powder is removed and dried.

3. A process according to claim 2 which further comprises treating said powder with methanol to produce an insoluble fraction and a methanolic solution, washing and drying said insoluble fraction to produce a powder containing pancreozymin.

4. A process according to claim 3 in which said powder containing pancreozymin is further purified by dialysis, followed by treatment with acetone and then with anhydrous ether to form a precipitate.

5. A process according to claim 2 which further comprises treating said powder with methanol to produce an insoluble fraction and a methanolic solution, subjecting said methanolic solution to successive adjustment of pH to about 5.2 and about 7.5 to form precipitates and removing said precipitates, adjusting pH of said methanolic solution to about 6, treating said methanolic solution with ether to form a precipitate which is separated, washed and dried to produce a powder containing secretin.

6. A process according to claim 5 in which said powder containing secretin is further purified by dialysis followed by treatment with acetone and then with anhydrous ether to form a precipitate.

7. A process according to claim 1 wherein said precipitate of step (e) is washed with acetone and anhydrous ether and dried to form a powder containing pancreozymin and secretin.

8. A process as claimed in claim 7 which further comprises treating said powder with methanol to produce an insoluble fraction and a methanolic solution washing and drying said insoluble fraction to produce a powder containing pancreozymin.

9. A process according to claim 8 in which said powder containing pancreozymin is further purified by dialysis, followed by treatment with acetone and then with anhydrous ether to form a precipitate.

10. A process according to claim 7 which further comprises treating said powder with methanol to produce an insoluble fraction and a methanolic solution, subjecting said methanolic solution to successive adjustment of pH to about 5.2 and about 7.5 to form precipitate and removing said precipitates, adjusting pH of said methanolic solution to about 6, treating said methanolic solution with ether to form a precipitate which is separated, washed and dried to produce a powder containing secretin.

11. A process according to claim 10 in which said powder containing seretin is further purified by dialysis, followed by treatment with acetone and then with anhydrous ether to form a precipitate.

References Cited

Greengard et al.: Am. J. of Physiology, vol. 124 (1938), pp. 427–429.

Grossman: Citamins and Hormones, vol. 16 (1958), pp. 179–181.

Gershbein: J. A. C. S., vol. 74 (1952), pp. 679–681.

SAM ROSEN, Primary Examiner